(12) United States Patent
Anderson

(10) Patent No.: US 7,089,492 B2
(45) Date of Patent: Aug. 8, 2006

(54) AUTOMATED CONVERSION OF CALS-COMPATIBLE TABLES TO ACCESSIBLE HTML TABLES

(75) Inventor: Robert Dan Anderson, Minneapolis, MN (US)

(73) Assignee: International Business Machines Corporation, Armonk, NY (US)

( * ) Notice: Subject to any disclaimer, the term of this patent is extended or adjusted under 35 U.S.C. 154(b) by 497 days.

(21) Appl. No.: 10/406,671

(22) Filed: Apr. 3, 2003

(65) Prior Publication Data

US 2004/0199870 A1   Oct. 7, 2004

(51) Int. Cl.
  G06F 15/00   (2006.01)
  G06F 5/00    (2006.01)
(52) U.S. Cl. .............. 715/523; 715/500; 715/513; 715/517
(58) Field of Classification Search ........... 715/513, 715/503, 523, 517
  See application file for complete search history.

(56) References Cited

U.S. PATENT DOCUMENTS

| | | | | |
|---|---|---|---|---|
| 5,893,127 | A * | 4/1999 | Tyan et al. | 715/513 |
| 6,175,843 | B1 * | 1/2001 | Muramoto et al. | 715/513 |
| 6,373,504 | B1 * | 4/2002 | Nielsen | 715/739 |
| 6,565,609 | B1 * | 5/2003 | Sorge et al. | 715/503 |
| 6,757,870 | B1 * | 6/2004 | Stinger | 715/513 |
| 6,948,132 | B1 * | 9/2005 | Bennett et al. | 715/760 |

OTHER PUBLICATIONS

Request of Stevens (On-line discussion of Request by Stevens and Responses by Kosek and Beckers, discussions dated Jun. 7, 2001, last downloaded on Oct. 6, 2005 from www.biglist.com/lists/xsl-list/archives/200106/msg00234.html, pp. 1-4.*

CALS—Computer Aided Acquisition and Logistics Support Raster Format, last updated Oct. 21, 2002, downloaded on Oct. 5, 2005 from web.archive.org: Www.faqs.org/faqs/graphics/fileformats-faq/part3/section-24.html, pp. 1-2.*

* cited by examiner

*Primary Examiner*—Doug Hutton
*Assistant Examiner*—Michael K. Botts
(74) *Attorney, Agent, or Firm*—Wood, Herron & Evans, LLP

(57) ABSTRACT

An apparatus, program product and method support the automated conversion of a table formatted in a CALS-compatible format to an HTML-compatible format, e.g., for use by presentation of the table by a screen reader or other application requiring knowledge of what headers apply to a given cell in a table. A table may be converted from a CALS-compatible format to an HTML-compatible format by assigning an identifier to each header cell in the table, in particular by embedding the identifier in an HTML identifier attribute for such header cell. Then, for each non-header cell in the table, any overlapping header cells therefor may be detected, and the identifier for any detected overlapping header cell may be embedded in an HTML headers attribute for such non-header cell.

18 Claims, 3 Drawing Sheets

AUTOMATED CONVERSION OF CALS-COMPATIBLE TABLES TO ACCESSIBLE HTML TABLES

FIELD OF THE INVENTION

The invention relates to computers and computer software, and in particular, to document formatting and conversion of documents between different formats.

BACKGROUND OF THE INVENTION

Given the increasing pervasiveness of the Internet on contemporary society, it has become imperative that Internet content is accessible to as many individuals as possible, regardless of native languages, countries of origin, or disabilities. In fact, in the United States, the Americans with Disabilities Act (ADA), which was codified into law to guarantee equal opportunity for individuals with disabilities in public accommodations, employment, transportation, state and local government services, and telecommunications, applies to Internet content created in association with these various affected areas.

The ADA requires, for example, that content made available on the Internet be made accessible to those with visual impairments, in particular, by requiring Internet content to be compatible with screen readers used by the visually disabled to access the Internet. A screen reader is a software program that utilizes voice synthesis to read aloud the contents of a web page or other content displayed on a computer.

For the non-visually impaired, most Internet content is viewed using a program known as a web browser. A web browser predominantly accepts web pages and other Internet content that is formatted in a language referred to as Hypertext Markup Language (HTML). Likewise, most screen readers are configured to access HTML-formatted web pages, given the pervasive nature of HTML content on the Internet.

Web pages formatted in HTML are able to integrate text with a large number of components, including images, tables, audio clips, video clips, animations, etc. In addition, text may be formatted with specific fonts, colors, attributes, etc. HTML is a tag-based markup language, whereby formats and components are described via tags that are embedded in a web page.

Tables, for example, are typically defined using a number of predefined tags. HTML tables include an array of cells disposed in rows and columns, and can include header columns and/or rows in addition to regular cells.

To comply with accessibility requirements, each non-header cell in an HTML table must indicate what headers apply to that cell. By doing so, a screen reader can alert a user as to which headers apply to a particular cell being accessed by the user. This capability is typically supported by first giving every header cell an ID attribute, and then configuring each cell in the table to point to every related header cell by placing the header's ID into the "headers" attribute for that cell.

In simple tables, where each non-header cell takes up no more than one row or column, it is relatively straightforward process to assign each non-header cell the ID's of the applicable row and/or column header. For complex tables, however, where individual cells may span multiple columns and/or rows, the assignment of applicable row/header ID's to each non-header cell is more problematic. In particular, any header that spans multiple columns and/or rows must be pointed to by cells in every column/row spanned by that header. Likewise, any non-header cell that spans multiple columns/rows must point to every header that fully or partially overlaps that cell.

Whenever a web page is originally authored in HTML format, the inclusion of appropriate header ID's in an HTML table for accessibility purposes is relatively straightforward. Moreover, even when a graphical HTML-based development environment is used, the inclusion of such functionality into the program code that generates table HTML code is relatively effortless.

However, this scenario is substantially more problematic when web pages are authored in other formats, and then converted to HTML by automated tools. For example, the Extensible Markup Language (XML) is often used in data-driven applications to generate tables and other data presentations. In XML, the building blocks of documents are defined by Document Type Definitions (DTD's). Tables, for example, may be defined using a DTD referred to as the CALS Table Model, which is also used as the basis for the Oasis XML Exchange Table Model. Tables defined using the CALS Table Model, as well as tables defined using other DTD's based upon the CALS Table Model such as the Oasis XML Exchange Table Model, will hereinafter collectively be referred to as "CALS-compatible" tables.

CALS-compatible tables are typically not directly readable by web browsers, and as a result, such tables typically must be converted to HTML prior to viewing in a web browser. Oftentimes, it would be desirable to be able to utilize a software tool to automate the conversion of such tables to HTML. However, it has been found that certain automated tools, such as those promulgated by the Wold Wide Web Consortium, are not readily capable of converting these tables to an HTML format for accessibility and access by screen readers, typically because such tools are intended to be side-effect-free, and as a result do not permit variables to be set and reset. As a result, developers are often required to manually edit the resulting tables for compliance with accessibility requirements. Given, however, the volume of Internet content, and the frequency at which it is updated, any requirement for manual editing can be extremely burdensome for a content provider.

One factor that complicates the problem of automatically converting CALS-compatible tables to accessible HTML tables stems from the limitations of the tools that are typically used to perform such conversions. Many conversions, for example, are performed using XSLT, which is a transformation language used to convert XML documents to other formats using the XSL Stylesheet Language for XML. XSLT, however, does not permit variables, once assigned specific values, to thereafter be changed to different values. From the standpoint of converting CALS-compatible tables to HTML, this limitation of XSLT eliminates the ability to use straightforward programming techniques, such as matrix-based operations, to determine the appropriate headers to identify in each non-header cell of a table being converted to HTML. As such, XSLT has not been considered a viable environment for converting CALS-compatible tables to accessible HTML tables.

Therefore, a significant need exists in the art for a manner of automating the conversion of CALS-compatible tables to HTML, while complying with accessibility requirements for the same.

SUMMARY OF THE INVENTION

The invention addresses these and other problems associated with the prior art by providing an apparatus, program product and method that support the automated conversion of a table formatted in a CALS-compatible format to an accessible HTML-compatible format, e.g., for use by presentation of the table by a screen reader or other application requiring knowledge of what headers apply to a given cell in a table. Moreover, such support extends to complex tables that incorporate cells that span multiple columns and/or rows of a table. By doing so, the degree of manual intervention connected with customizing documents incorporating CALS-compatible tables to a format suitable for access by a screen reader may be reduced or eliminated altogether.

Consistent with one aspect of the invention, a table may be converted from a CALS-compatible format to an HTML-compatible format by assigning an identifier to each header cell in the table, in particular by embedding the identifier in an HTML identifier attribute for such header cell. Then, for each non-header cell in the table, any overlapping header cells therefor may be detected, and the identifier for any detected overlapping header cell may be embedded in an HTML headers attribute for such non-header cell.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

The embodiments discussed hereinafter take tables marked up using the CALS DTD, the Oasis XML Exchange Table Model, or another CALS-compatible format and converts them into HTML tables that are accessible to screen readers and other programs requiring knowledge of what headers apply to a given cell in a table.

To make an HTML table accessible, every non-header cell, or entry, in the table must indicate which headers apply to that cell. This is accomplished by first giving every header cell an identifier, or ID, attribute. Each cell in the table must then point to every related header cell, which is accomplished by placing the header's ID into the "headers" attribute for that cell. It will be appreciated that identifier and headers attributes used for column headers may either be similar to or different from the identifier and headers attributes used for row headers.

While it is relatively straightforward to determine the headers attribute in simple tables, in which no cell takes up more than one row or column, it is more problematic for complex tables, in which cells may span any number of rows or columns. For complex tables, any header that spans multiple columns or rows must be pointed to by cells in every column and/or row overlapped by that header. Likewise, any ordinary cell that spans multiple columns or rows must point to every header that fully or partially overlaps that cell.

Figures 1, 2, 3:
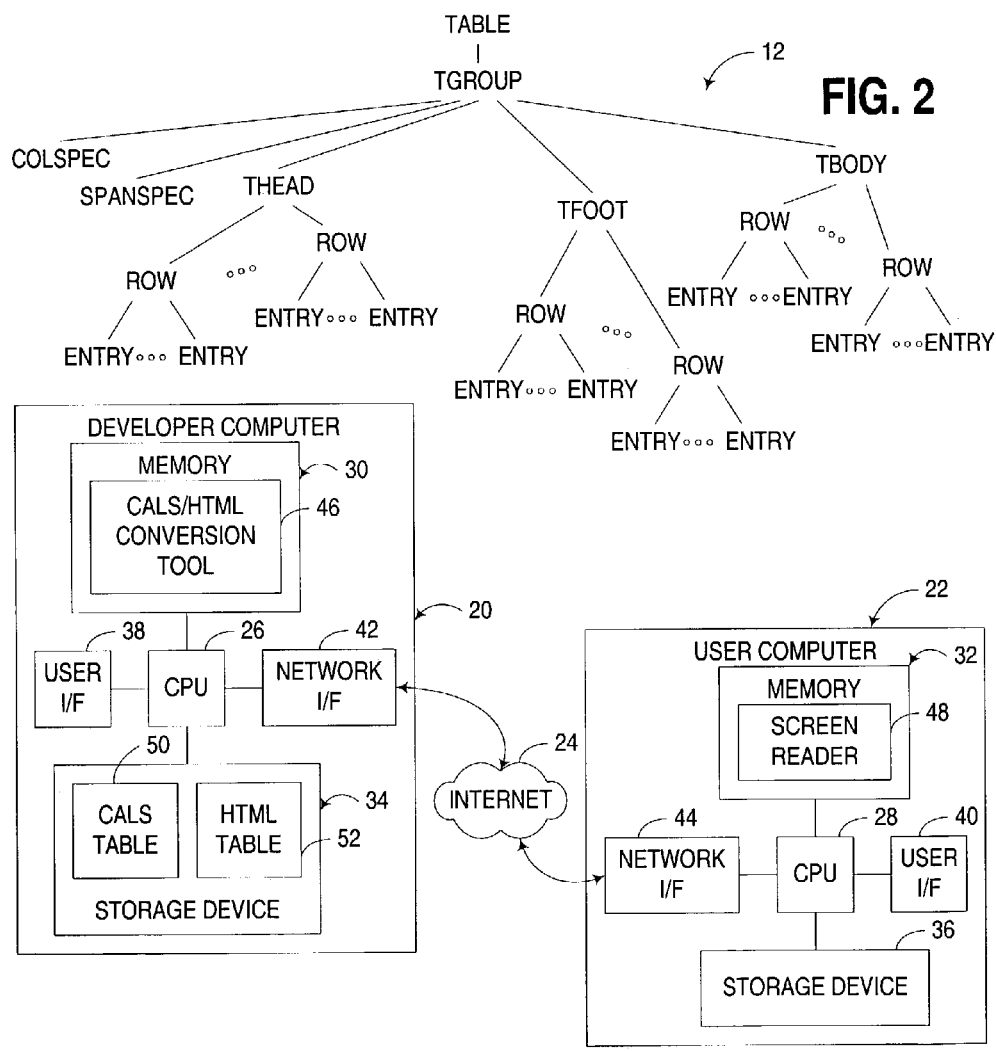
FIG. 1 is a block diagram of an exemplary complex table incorporating cells that span multiple columns and rows.
FIG. 2 illustrates a data structure for a generic CALS-compatible table.
FIG. 3 is a block diagram illustrating the principal hardware and software components in a developer computer capable of converting a CALS-compatible table to an HTML-compatible table in a manner consistent with the invention, and a user computer capable of host a screen reader for viewing the HTML-compatible table.

As an example, an exemplary complex table 10 is illustrated in FIG. 1, including six columns and four rows, with each column labeled 1–6 and each row labeled 1–4. Row 1 and column 1 are each further illustrated as "header" rows and columns, with the headers in the header row being identified as "HEAD1", "HEAD2", "HEAD3", "HEAD4", and "HEAD5", and the headers in the header column being identified as "ROW1", "ROW2", and "ROW3" (the cell at column 1, row 1 being considered a header from the header row).

A number of non-header cells A–M are also illustrated, with cell A illustrating a cell that spans multiple rows, and cell B illustrating a cell that spans multiple columns. Moreover, it may be seen that header cell "header 5" spans multiple columns, including those within which cells C, D, G, H, L, and M are found (columns 5 and 6).

To ensure proper and accurate operation of a screen reader, the screen reader will need to be able to identify, for example, that row headers "row 1" and "row 2" apply to cell A (along with column header "header 2"), that column headers "header 3" and "header 4" apply to cell B (along with row header "row 1"), and that column header "header 5" applies to each of cells C, D, G, H, L and M.

It will be appreciated that a complex table may include header cells that span multiple rows or columns and/or non-header cells that span multiple rows and/or columns. Furthermore, complex tables may include multiple header rows and/or multiple header columns, and in some instances, header rows or columns may be omitted from some complex tables (e.g., a complex table may have a header row but no header column).

A CALS-compatible table is typically incorporated into an SGML, XML or other tagged document and is defined in a well known manner that is well known in the art. An exemplary data structure for a generic CALS-compatible table, for example, is illustrated in FIG. 2. In particular, a tree data structure 12 is shown, with a root element "table" having one or more "tgroup" child elements, each with several additional child elements "colspec", "spanspec", "thead", "tfoot", and "tbody". Each of the aforementioned elements are typically represented in an SGML or XML document using "table", "tgroup", "colspec", "spanspec", "thead", "tfoot" and "tbody" tags. Under each "tgroup" element, only a "tbody" element is required.

Each "colspec" element defines how an associated column in a table is formatted. Such an element may include, among other information, a "colname" attribute used to identify the column. The "spanspec" element defines the horizontal "span" of columns. The "thead" element may be used to identify a header row, and when present includes at least one "row" child element and at least one "entry" child element, which are used to respectively delimit rows and individual entries in a header. Likewise the "tfoot" element may be used to identify a footer row, and when present includes at least one "row" child element and at least one "entry" child element, which are used to respectively delimit rows and individual entries in a footer. Similarly, the "tbody" element may be used to identify a non-header and non-footer row, and includes at least one "row" child element and at least one "entry" child element, which are used to respectively delimit rows and individual entries in the body of a table.

It will be appreciated that each element typically has a number of additional attributes, and furthermore, that other elements may also be defined in a CALS-compatible table. In addition, in some embodiments, it may be desirable or necessary to depart from the CALS-compatible models for some purposes, e.g., by defining new tags and/or attributes. For example, many CALS-compatible models do not provide a way to designate that a column is a header column. As such, it may be desirable to utilize an additional attribute or tag to provide such a designation. One suitable implementation is to add a "rowheader" attribute to a table element to indicate that the first column of a table should be treated as a header. As wilt become more apparent below, when such functionality is supported, additional header information, utilized to render a table readable by a screen reader, may be added to the table.

Moreover, for the sake of convenience, a "header cell" will hereinafter be used to apply table cells identified as being in a table header by virtue of a "thead" element, as well as tables cells identified as being in a table footer by virtue of a "tfoot" element, given that a "footer" is functionally equivalent to a "header" insofar as it characterizes the information in a particular column or row. "Header cells" may also be defined outside of "thead" or "tfoot" elements, e.g., via the use of a "rowheader" attribute as described above for the purpose of defining a row header, or even the use of a "rowfooter" attribute that could be used to identify a cell as being a part of a footer for a cell.

Embodiments consistent with the invention desirably allow accessible complex HTML tables to be created from CALS-compatible tables without manually adding attributes into the output HTML. Moreover, in embodiments discussed hereinafter, the conversion may be performed using XSLT, which is maintained by the World Wide Web Consortium (or W3C), the group that maintains the HTML DTD. Other programming languages may be used in the alternative; however, the herein-described conversion routine is particularly well suited for applications where resettable variables are not supported by the underlying programming language within which the conversion routine is implemented. It will also be appreciated that, while one of the predominant benefits of the herein-described embodiments relates to the conversion of complex tables from a CALS-compatible format to HTML, such embodiments may also process non-complex tables in a similar manner.

FIG. 3 next illustrates an exemplary hardware and software environment suitable for implementing a table conversion tool consistent with the invention. In particular, FIG. 3 illustrates a developer computer 20 interfaced with a user computer 22 over a network, e.g., over the Internet, represented at 24. For the purposes of the invention, either computer 20, 22 is an electronic apparatus that may be implemented by practically any type of computer, computer system or other programmable electronic device, including a client computer, a server computer, a portable computer, a handheld computer, an embedded controller, etc. Moreover, either computer 20, 22 may be implemented using one or more networked computers, e.g., in a cluster or other distributed computing system.

Each computer 20, 22 typically includes a central processing unit (CPU) 26, 28 including one or more microprocessors coupled to a memory 30, 32, which may represent the random access memory (RAM) devices comprising the main storage of computer 20, 22, as well as any supplemental levels of memory, e.g., cache memories, non-volatile or backup memories (e.g., programmable or flash memories), read-only memories, etc. In addition, each memory 30, 32 may be considered to include memory storage physically located elsewhere in the respective computer 20, 22, e.g., any cache memory in a processor in either of CPU's 26, 28, as well as any storage capacity used as a virtual memory, e.g., as stored on a mass storage device 34, 36, or on another computer coupled to one of computers 20, 22.

Each computer 20, 22 also typically receives a number of inputs and outputs for communicating information externally. For interface with a user or operator, each computer 20, 22 typically includes a user interface 38, 40 incorporating one or more user input devices (e.g., a keyboard, a mouse, a trackball, a joystick, a touchpad, and/or a microphone, among others) and a display (e.g., a CRT monitor, an LCD display panel, and/or a speaker, among others). Otherwise, user input may be received via another computer or terminal coupled to the respective computer (e.g., if a computer 20, 22 is implemented as a server or other multi-user computer.

For non-volatile storage, each computer 20, 22 typically includes one or more mass storage devices 34, 36, e.g., a floppy or other removable disk drive, a hard disk drive, a direct access storage device (DASD), an optical drive (e.g., a CD drive, a DVD drive, etc.), and/or a tape drive, among others. Furthermore, each computer 20, 22 may also include an interface 42, 44 with one or more networks (e.g., a LAN, a WAN, a wireless network, and/or the Internet 24, among others) to permit the communication of information with other computers and electronic devices. It should be appreciated that each computer 20, 22 typically includes suitable analog and/or digital interfaces between CPU's 26, 28 and each of components 30–44, as is well known in the art.

Each computer 20, 22 operates under the control of an operating system (not shown), and executes or otherwise relies upon various computer software applications, components, programs, objects, modules, data structures, etc. (e.g., a CALS/HTML conversion tool 46 resident in computer 20, and a screen reader 48 resident in computer 22). Moreover, various applications, components, programs, objects, modules, etc. may also execute on one or more processors in another computer coupled to either computer 20, 22 via a network, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, magnetic tape, optical disks (e.g., CD-ROMs, DVDs, etc.), among others, and transmission type media such as digital and analog communication links.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Those skilled in the art will recognize that the exemplary environment illustrated in FIG. 3 is not intended to limit the present invention. Indeed, those skilled in the art will recognize that other alternative hardware and/or software environments may be used without departing from the scope of the invention.

To implement CALS/HTML conversion in a manner consistent with the invention, a CALS/HTML conversion tool 46 is resident in developer computer 20. Tool 46 may be a standalone tool or application, or may be integrated with other program code, e.g., to provide a suite of functions suitable for converting documents to a format suitable for access by a screen reader, or more broadly for developing screen reader-compatible documents. Tool 46 is utilized to process a CALS-compatible table represented at 50 and generate therefrom an HTML-compatible table represented at 52. Each table may be stored in a separate data structure, or alternatively, may be incorporated into a document including additional information to be displayed and/or verbalized along with the respective table.

User computer 22, in turn, has a screen reader 48 resident therein for verbalizing, or generating audible representations of, HTML-compatible documents, including documents incorporating HTML-compatible tables. In the illustrated embodiment, screen reader application 48 is conventional in nature, and requires no unique functionality to handle HTML-compatible tables generated by tool 46.

It will be appreciated that the tables generated by tool 46, and presented by screen reader 48, may be resident in different computer systems at different points in time. For example, developer computer 20 may also serve as a web server to which user computer 22 connects to retrieve HTML-compatible documents for presentation by screen reader 48. In the alternative, tables generated by tool 46 may be stored on a separate web server that is accessible by computer 22. Moreover, tables generated by tool 46 may be used by a screen reader resident on the same computer, or may be stored on a removable storage medium and conveyed to computer 22 by alternate means to a computer network. Other alternatives will be apparent to one of ordinary skill in the art having the benefit of the instant disclosure.

As noted above, in order to make tables accessible, each non-header cell typically must use a "headers" attribute to associate itself with appropriate cells in the table header. In the illustrated implementation of tool 46 discussed hereinafter, XSLT expressions are used to determine the location of a current cell within a table, based on attributes on the cell. The tool then recursively scans each row of the header to find cells that overlap the current cell. Then, once all overlapping cells have been found, the ID's are saved while row headers (those in the first column) are evaluated.

For row headers, the herein-described implementation of the tool makes use of an extra "rowheader" attribute, which may indicate, for example, whether the first column of a row is a row header, or alternatively, the identities of which, if any, columns in a row are to be considered row headers. If this attribute indicates that the first row is a header row, the first entry of each row is analyzed. If the row overlaps all or part of the current cell, its ID is saved. Once all overlapping cells have been determined, processing returns to the current cell. ID's for all headers above the cell are added to those from the first column, and the result is placed in the headers attribute.

Figure 4:
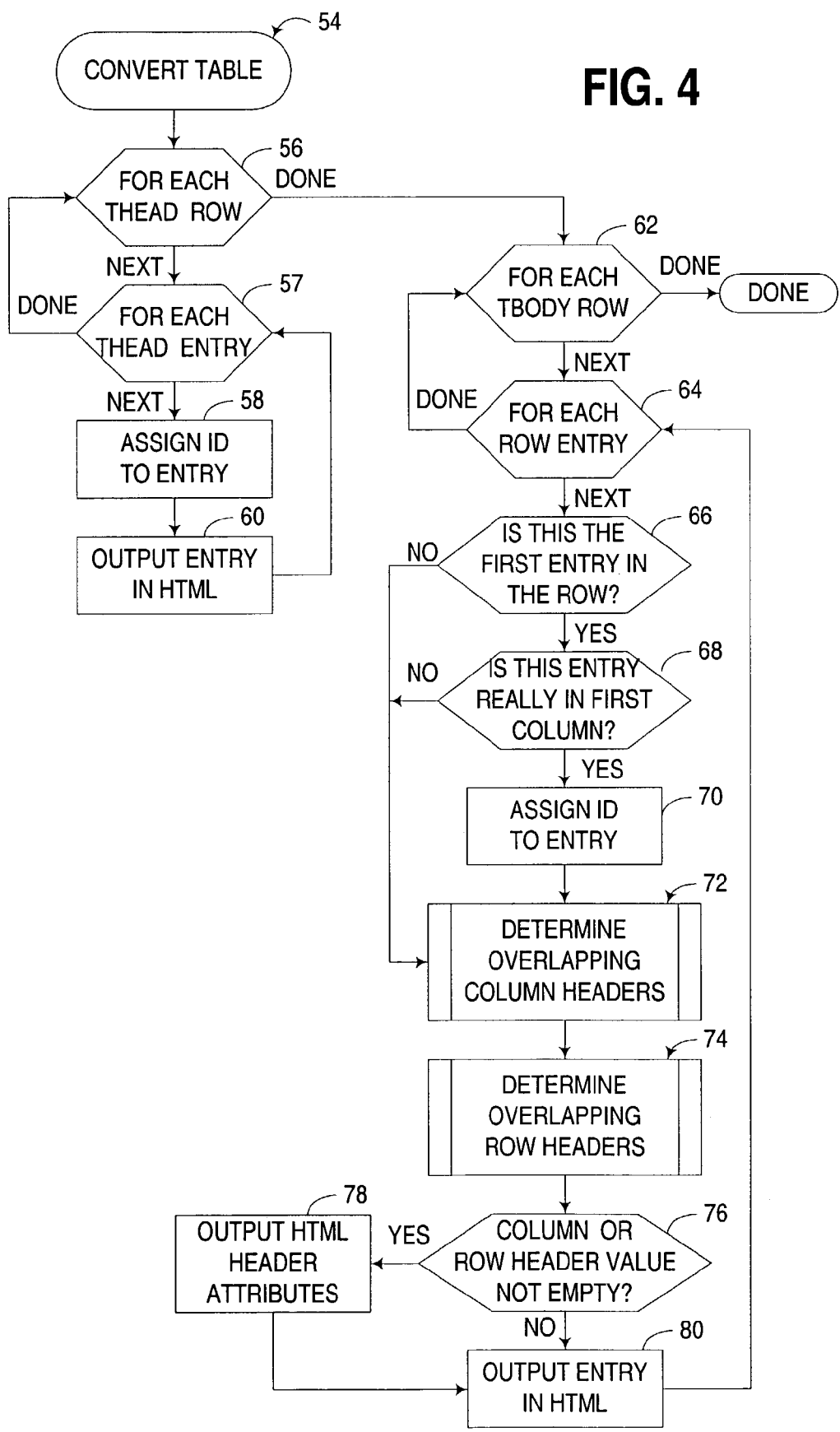
FIG. 4 is a flowchart illustrating the program flow of a convert table routine executed by the conversion tool referenced in FIG. 3.
Figure 5:
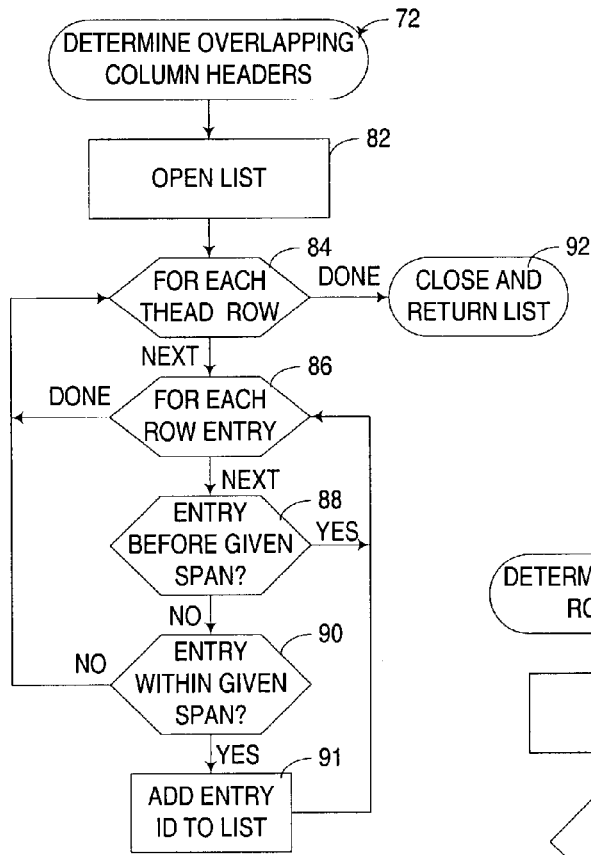
FIG. 5 is a flowchart illustrating the program flow of the determine overlapping column headers routine referenced in FIG. 4.
Figure 6:
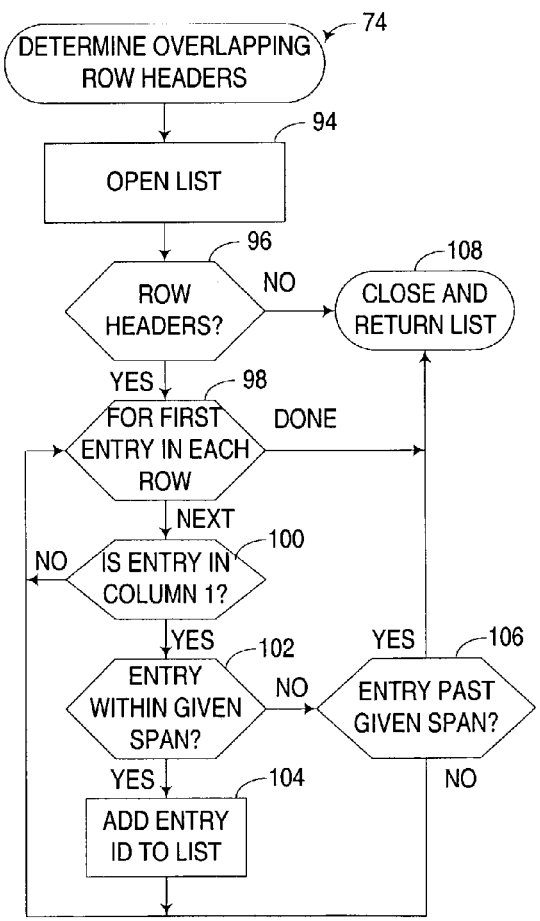
FIG. 6 is a flowchart illustrating the program flow of the determine overlapping row headers routine referenced in FIG. 4.

FIGS. 4–6 next illustrate an exemplary convert table routine 54 that may be executed by tool 46 to convert a table from a CALS-compatible format to HTML. Routine 54 may be called, for example, during processing of an XML or SGML document, and in response to detection of a CALS-compatible table in the document. As noted above, routine 54 may be implemented using XSLT, and it will be appreciated that such implementation in XSLT would be well within the abilities of one of ordinary skill in the art having the benefit of the instant disclosure.

As shown in FIG. 4, routine 54 begins in blocks 56 and 57 by initiating a loop to process each "thead" entry in the CALS-compatible table, i.e., each entry element detected within a "thead" tagged region (between a matching set of <thead> and </thead> tags). In particular, block 56 iterates through each row in the "thead" tagged region, while for each such row, block 57 iterates through each entry in the current row.

For each such entry, block 57 passes control to block 58 to assign an ID to that entry. Block 60 then outputs the HTML equivalent of the thead entry, and control returns to block 57 to process additional thead entries. It will be appreciated that the conversion of CALS-compatible table information, e.g., thead and tbody entries, into suitable HTML code would be well within the abilities of one of ordinary skill in the art having the benefit of the instant disclosure.

Once all thead entries have been processed, block 56 passes control to block 62 to initiate a loop to process each "tbody" entry in the table, i.e., each entry element detected within a "tbody" tagged region (between a matching set of <tbody> and </tbody> tags). In particular, block 62 iterates through each row in the "tbody" tagged region, while for each such row, block 64 iterates through each entry in the current row.

For each such entry, block 64 passes control to blocks 66 and 68 to determine whether the current cell is a row header. In particular, block 66 determines whether the entry is the first entry in the row, and block 68 determines whether the entry really is in the first column. If both determinations are true, control passes to block 70 to assign an ID to the entry. Control then passes to call a determine overlapping column headers routine 72 to determine all overlapping column headers. Otherwise, if either determination in block 66 or 68 is false, block 70 is skipped, and routine 72 is called.

Next, upon completion of routine 72, a determine overlapping row headers routine 74 is called to determine all overlapping row headers. The result of each determination is a list of column and row headers that overlap the current tbody entry, with a "0" value returned from either of routines 72, 74 if the respective determination determines that no overlapping column/row headers are found for that entry.

Next, block 76 determines whether either of the column list and the row header list has returned a non-zero value (indicating that there is at least one column header and/or row header that overlaps the entry). If so, control passes to block 78 to output HTML header attributes that list the ID's of the overlapping column and row headers. By doing so, the header information necessary for meeting accessibility requirements is embedded in the HTML table.

Next, block 80 outputs the HTML equivalent of the entry, and control returns to block 64 to process additional entries. Moreover, returning to block 76, if the determination made in block 76 is negative, block 78 is skipped, and control passes directly to block 80.

Processing of the tbody entries continues until all tbody entries have been processed. Routine 54 is then complete, with an HTML-equivalent table to the CALS-compatible table having been output by the routine, and with the necessary accessibility information embedded in the table.

FIG. 5 next illustrates routine 72 of FIG. 4 in greater detail. When called, routine 72 is passed the span of a current tbody entry by routine 54, and begins in block 82 by opening a list of overlapping column headers (which initially will contain no values). Next, block 84 initiates a loop to process each row of the thead. For each such row, block 84 passes control to block 86 to process each entry in the current thead row. For each such entry, block 88 determines whether the span of the thead entry is before that provided to the routine, and if so, returns control to block 86 to process the next thead entry in the current row. Otherwise, block 88 passes control to block 90 to determine whether the span of the thead entry is within (i.e., overlaps) that provided to the routine, and if so, passes control to block 91 to add the ID of the overlapping thead entry to the list. Control then passes to block 86 to process the next thead entry in the current-row.

Once all thead entries have been processed in the current row, block 86 passes control to block 84 to process another thead row. Once all thead rows have been processed block 84 passes control to block 92 to terminate the routine and close and return the generated list of overlapping column headers.

To determine the start and end columns for an entry, whether a regular entry or a header entry, it may be desirable to access any or all of three possible sources of column information. First, the column name(s) of an entry may be encoded as an attribute in the entry, whereby a mapping of column name(s) to column number(s) may be used to determine the appropriate column number(s) for an entry. Second, a spanname may be referenced as an attribute in an entry, whereby column information specified in a spanspec element in the table may be used as the entry column information. Third, an entry may directly specify column start and column end names as attributes in the entry.

With these sources in mind, the manner in which an overlapping thead entry is determined in blocks 84–90 can vary depending upon the underlying programming environment. In XSLT, for example, each call of routine 72 may process the table header using a new mode, and sequentially process each thead entry in the table header. The start and end location (i.e., the span) of each thead entry may then be determined in any of the manners discussed above, with a determination made as to whether the span of the thead entry is before the given span. If so, additional thead entries in the same row (if any) may then be processed. Otherwise, a determination may be made as to whether the span of the thead entry overlaps the given span, whereby the ID of that thead entry is added to the list in the event of a detected overlap. Then, whenever it is determined that the span is past the given span, or the entry is the last in the row, processing may progress to the next thead row. Once each row in the thead is processed, the list is complete, and control may return to the current entry in the tbody. It will be appreciated that developing XSLT program code to implement the above functionality would be within the abilities of one of ordinary skill in the art having the benefit of the instant disclosure.

Now turning to FIG. 6, routine 74 is illustrated in greater detail. When called, routine 74 is passed the span of a current tbody entry by routine 54, and begins in block 94 by opening a list of overlapping row headers (which initially will contain no values). Next, block 96 determines whether row headers are even used in the table. If so, control passes to block 98 to initiate a loop to process the first entry in each row of the table. For each such entry, block 98 passes control to block 100 to determine whether the entry is even in column 1 of the table. If not, control returns to block 98 to process the next row. If so, control passes to block 102 to determine whether the span of the entry overlaps that of the given span. If so, control passes to block 104 to add the ID of the overlapping entry to the list. Control then passes to block 98 to process the first entry in the next row, if any. Returning to block 102, if the entry is not overlapping, control passes to block 106 to determine whether the entry is past the given span. If not, control returns to block 98 to process the first entry in the next row, if any. Otherwise, control passes to block 108 to terminate the routine and close and return the list. Returning also to blocks 96 and 98, if either no row headers are used, or after all rows have been processed, control passes to block 108.

It will be appreciated that, in other embodiments, it may be desirable to identify headers disposed in another column (e.g., for a column footer). Such identification may utilize a location method as described above, or may look only at the last entry in each row in the case of a column footer. Modification of routine 74 to incorporate such additional functionality would be well within the abilities of one of ordinary skill in the art having the benefit of the instant disclosure.

As noted above, row headers in the herein-described implementation may be identified through the use of a "row header" attribute in an entry. To identify overlapping row headers, a process similar to that described above in connection with column headers may be used. For example, in an XSLT implementation, a current row may be found rather simply given that each row has a single <row> tag. If an entry has a "morerows" attribute, this indicates that the entry spans more than one row, and tells how many (e.g., "<entry morrows="1">" means that an entry takes up a total of two rows). The start and end rows may be saved in variables, and if an entry is not itself in a first column, the first entry in every row may be processed using a new mode, with the start and end positions (i.e., span) of the entry passed in as values. Processing as described above in connection with routine 74 may then be performed. As above, the implementation of routine 74 in XSLT would be well within the abilities of one of ordinary skill in the art having the benefit of the instant disclosure.

To further illustrate the operation of the herein-described embodiment, exemplary CALS-compatible code for the table illustrated in FIG. 1 is presented below in Table I:

TABLE I

CALS TABLE INPUT

```
<table rowheader="firstcol">
<tgroup cols="6">
<colspec colname="col1"/>
<colspec colname="col2"/>
<colspec colname="col3"/>
<colspec colname="col4"/>
<colspec colname="col5"/>
<colspec colname="col6"/>
<thread>
<row>
<entry colname="col1">HEAD1</entry>
<entry colname="col2">HEAD2</entry>
<entry colname="col3">HEAD3</entry>
<entry colname="col4">HEAD4</entry>
<entry namest="col5" nameend="col6">HEAD5</entry>
</row>
</thread>
<tbody>
<row>
<entry colname="col1">ROW1</entry>
<entry colname="col2" morerows="1">A</entry>
<entry namest="col3" nameend="col4">B</entry>
<entry colname="col5">C</entry>
<entry colname="col6">D</entry>
</row>
<row>
<entry colname="col1">ROW2</entry>
<entry colname="col3">E</entry>
<entry colname="col4">F</entry>
<entry colname="col5">G</entry>
<entry colname="col6">H</entry>
</row>
<row>
<entry colname="col1">ROW3</entry>
<entry colname="col2">I</entry>
<entry colname="col3">J</entry>
<entry colname="col4">K</entry>
<entry colname="col5">L</entry>
<entry colname="col6">M</entry>
</row>
</tbody>
</tgroup>
</table>
```

Processing of the above code by routine 54 would proceed as outlined above. Of note, for entry A, routine 72 would return a column header ID for the "HEAD2" column header, while routine 74 would return row header ID's for both the "ROW1" and "ROW2" row headers (based upon the start and end rows for entry A being 2 and 3, respectively). Likewise, for entry B, routine 72 would return column header ID's for the "HEAD3" and "HEAD4" column headers (based upon the start and end columns for entry B being 3 and 4, respectively), while routine 74 would return a row header ID for the "ROW1" row header. Moreover, for each of entries C, D, G, H, L and M, routine 72 would return a column header ID for the "HEAD5" column header (based upon the start and end columns for the "HEAD5" column header being 5 and 6, respectively), Table II continues the above example by illustrating exemplary HTML code for the above table, subsequent to processing by routine 54:

TABLE II

HTML TABLE OUTPUT

```
<table frame="border" border="1" rules="all">
<colgroup><col/><col/><col/><col/><col/><colgroup>
<thread align="left">
<tr>
<th valign="top" id="d0e29">HEAD1</th>
<th valign="top" id="d0e31">HEAD2</th>
<th valign="top" id="d0e33">HEAD3</th>
<th valign="top" id="d0e35">HEAD4</th>
<th colspan="2" valign="top" id="d0e37">HEAD5</th>
</tr>
</thead>
<tbody>
<tr>
<td valign="top" id="d0e41" headers="d0e29">ROW1</td>
<td rowspan="2" valign="top" headers="d0e41 d0e52 d0e31">A</td>
<td colspan="2" valign="top" headers="d0e41 d0e33 d0e35">B</td>
<td valign="top" headers="d0e41 d0e37">C</td>
<td valign="top" headers="d0e41 d0e37">D</td>
</tr>
<tr>
<td valign="top" id="d0e52" headers="d0e29">ROW2</td>
<td valign="top" headers="d0e52 d0e33">E</td>
<td valign="top" headers="d0e52 d0e35">F</td>
<td valign="top" headers="d0e52 d0e37">G</td>
<td valign="top" headers="d0e52 d0e37">H</td>
</tr>
<tr>
<td valign="top" id="d0e63" headers="d0e29">ROW3</td>
<td valign="top" headers="d0e63 d0e31">I</td>
<td valign="top" headers="d0e63 d0e33">J</td>
<td valign="top" headers="d0e63 d0e35">K</td>
<td valign="top" headers="d0e63 d0e37">L</td>
<td valign="top" headers="d0e63 d0e37">M</td>
</tr>
</tbody>
</table>
```

It will be appreciated that the additional attributes may be processed in a CALS-compatible table to generate corresponding HTML code. It will also be appreciated that various additional modifications may be made to the herein-described embodiments without departing from the spirit and scope of the invention. Therefore, the invention lies in the claims hereinafter appended.

What is claimed is:

1. A computer-implemented method of converting a table from a CALS-compatible format to an HTML-compatible format, the method comprising:
   for each header cell in the table, assigning an identifier to such header cell by embedding the identifier in an HTML identifier attribute for such header cell;
   for each non-header cell in the table, detecting any overlapping header cells therefor; and
   for each non-header cell in the table, embedding the identifier for any detected overlapping header cell in an HTML headers attribute for such non-header cell.

2. The method of claim 1, wherein assigning identifiers, detecting overlapping header cells and embedding identifiers are performed using XSLT expressions.

3. The method of claim 1, wherein detecting any overlapping header cells for a non-header cell in the table includes identifying at least one header cell that overlaps such non-header cell.

4. The method of claim 3, wherein identifying at least one header cell that overlaps such non-header cell includes opening the table in a new mode.

5. The method of claim 1, wherein detecting any overlapping header cells for a non-header cell in the table includes determining a start and an end column for such non-header cell, and detecting at least one header cell that overlaps the start and end columns.

6. The method of claim 1, wherein detecting any overlapping header cells for a non-header cell in the table includes determining a start and an end row for such non-header cell, and detecting at least one header cell that overlaps the start and end rows.

7. The method of claim 1, further comprising sequentially iterating through each non-header cell in the table, and wherein detecting any overlapping header cells and embedding the identifier for any detected overlapping header cell are performed during each sequential iteration.

8. The method of claim 7, wherein detecting any overlapping header cells during a sequential iteration includes identifying all overlapping header cells for a current non-header cell.

9. An apparatus, comprising:
- a memory configured to store a table stored in a CALS-compatible format;
- a processor; and
- program code configured to convert the table to an HTML-compatible format by assigning an identifier to each header cell in the table via embedding the identifier in an HTML identifier attribute for such header cell, detecting any overlapping header cells for each non-header cell in the table, and, for each non-header cell in the table, embedding the identifier for any detected overlapping header cell in an HTML headers attribute for such non-header cell.

10. The apparatus of claim 9, wherein the program code is configured to assign identifiers, detect overlapping header cells and embed identifiers using XSLT expressions.

11. The apparatus of claim 9, wherein the program code is configured to detect any overlapping header cells for a non-header cell in the table by identifying at least one header cell that overlaps such non-header cell.

12. The apparatus of claim 11, wherein the program code is configured to identify at least one header cell that overlaps such non-header cell by opening the table in a new mode.

13. The apparatus of claim 9, wherein the program code is configured to detect any overlapping header cells for a non-header cell in the table by determining a start and an end column for such non-header cell, and detecting at least one header cell that overlaps the start and end columns.

14. The apparatus of claim 9, wherein the program code is configured to detect any overlapping header cells for a non-header cell in the table by determining a start and an end row for such non-header cell, and detecting at least one header cell that overlaps the start and end rows.

15. The apparatus of claim 9, wherein the program code is further configured to sequentially iterate through each non-header cell in the table, and to detect any overlapping header cells and embed the identifier for any detected overlapping header cell during each sequential iteration.

16. The apparatus of claim 15, wherein the program code is configured to detect any overlapping header cells during a sequential iteration by identifying all overlapping header cells for a current non-header cell.

17. A program product, comprising:
- program code configured to convert a table from a CALS-compatible format to an HTML-compatible format by assigning an identifier to each header cell in the table via embedding the identifier in an HTML identifier attribute for such header cell, detecting any overlapping header cells for each non-header cell in the table, and, for each non-header cell in the table, embedding the identifier for any detected overlapping header cell in an HTML headers attribute for such non-header cell;
- a signal bearing medium bearing the program code.

18. The program product of claim 17, wherein the signal bearing medium includes at least one of a recordable medium and a transmission medium.

* * * * *